United States Patent [19]

Bares

[11] Patent Number: 5,521,692
[45] Date of Patent: May 28, 1996

[54] METHOD AND APPARATUS FOR IDENTIFYING SUBSTRATE SURFACE RELIEF AND CONTROLLING PRINT QUALITY

[75] Inventor: Jan Bares, Webster, N.Y.

[73] Assignee: Xerox Corporation, Stamford, Conn.

[21] Appl. No.: 435,506

[22] Filed: May 5, 1995

[51] Int. Cl.$^6$ .......................... G03G 21/00; G01B 11/00
[52] U.S. Cl. .......................... 355/311; 355/208; 356/371; 356/376; 347/221
[58] Field of Search ..................................... 355/203, 208, 355/311; 250/559.04, 559.22, 559.44; 356/371, 376; 347/221; 382/108

[56] References Cited

U.S. PATENT DOCUMENTS

| | | | |
|---|---|---|---|
| 5,099,287 | 3/1992 | Sato | 355/311 X |
| 5,109,236 | 4/1992 | Watanabe et al. | 356/376 X |
| 5,225,890 | 6/1993 | Lee et al. | 356/371 |
| 5,237,404 | 8/1993 | Tanaka et al. | 356/376 X |
| 5,289,267 | 2/1994 | Busch et al. | 356/371 X |

*Primary Examiner*—Joan H. Pendegrass
*Assistant Examiner*—Sophia S. Chen
*Attorney, Agent, or Firm*—H. Fleischer; J. E. Beck; R. Zibelli

[57] ABSTRACT

A method and apparatus for identifying surface relief features of a substrate processed in a printing machine, and adjusting the machine parameters as a function thereof, before the substrate is processed through the machine. The apparatus includes a light source positioned adjacent to the substrate surface. A light sensing device, in a light receiving relationship with the substrate surface, detects light reflected from the substrate surface. A signal is generated indicative of sensed light intensity with a first magnitude range indicating ridges and a second magnitude range indicating depressions. Control circuitry, electrically connected to the light sensing device, receives the signals of ridges and depressions, and discriminates between them to generate a set of signals indicating surface relief features of the substrate.

12 Claims, 6 Drawing Sheets

METHOD AND APPARATUS FOR IDENTIFYING SUBSTRATE SURFACE RELIEF AND CONTROLLING PRINT QUALITY

This invention relates to optimizing copy quality and printing machine operating parameters by identifying the surface relief of a substrate, and adjusting printing machine substrate processing operations as a function thereof.

Copy quality is sensitive to the surface relief characteristics of the sheet used to receive the developed image in electrostatographic reproduction of images, as well as thermal ink jet, and thermal transfer reproduction of images. Distinct variations exist as to the level of surface relief found on a sheet, such as paper, (hereinafter referred to as a "substrate") that is used in a printing machine. Various machine parameters are affected by the surface relief of a particular substrate processed through the machine. Based on the substrate surface relief, these parameters can be adjusted for optimum functionality and for achieving optimum quality. For example, a goal in electrophotography is to have the correct amount of toner continuously deposited onto a substrate. When poor development control arises, two situations occur. Firstly, too little toner creates lighter images, and too much toner creates darker images and also may cause toner to appear in non-image areas. Secondly, too much toner causes excess toner waste which increases the expense of running the machine and increases wear of the machine components. Replacement or repair of these components is thereby required on a more frequent basis. The need for precise toner control is intensified by color development systems wherein individual color images are superimposed on each other to create a full color image.

Depressed portions of a substrate require application of a higher developed toner mass per unit area to achieve the same dark, uniform, sharp quality as produced on a flat portion of the substrate. Additionally, if a greater amount of toner is required on a depressed portion of a substrate, the development voltage, and/or the toner concentration, and/or the fuser set temperature must be raised to assure that the toner is completely fused to the substrate. Under-fused toner on a substrate creates the possibility of smears, streaks or blurred images. For a substrate requiring a greater amount of toner deposited thereon, an increased voltage may also be required for the corona generating devices associated with both the charging element and the transfer element. Uniformly increasing machine parameters such as the fuser set temperature, fuser dwell time, or voltage level to the charging device, transfer device or developer may eliminate certain quality problems on the depressed portions of the substrate. However, other negative factors are thereby created. For example, increased wear on these affected components causes the need for more frequent component repair or replacement. Furthermore, the increased power required to run the component at higher machine settings results in increased energy consumption and cost. Machines that can optimize quality as well as internal processing operations will have a greater latitude of operation and a competitive edge.

In response to these problems, a need exists for identifying the surface relief of a substrate to be processed in a machine while the substrate is in a static state, and for correspondingly adjusting the machine parameters that are affected by the surface relief before the substrate is processed through the machine.

Various approaches have been devised for detecting the roughness of substrates used in electrophotographic printing for adjusting machine parameters that are affected by the different levels of substrate roughness. The following disclosure may be relevant to various aspects of the present invention.

U.S. patent application Ser. No. 08/276,573 Applicants: Ferrante et al. Filed: Jul. 18, 1994

U.S. patent application Ser. No. 08/276,573 discloses an arrangement for determining the roughness of a substrate which is to be processed through a machine. Before the substrate is processed, adjustments are automatically made to machine parameters affected by different levels of substrate roughness. A light source projects light onto the substrate. Levels of both specular and diffused light are reflected back from the substrate to a light sensing device. A ratio value of the specularly reflected light to the diffusely reflected light is used to determine the roughness level of the substrate.

In accordance with one aspect of the invention, there is provided an apparatus for identifying surface relief features of a substrate surface. The apparatus includes a light source positioned adjacent to the substrate surface to illuminate the substrate surface at a grazing incidence of illumination. A light sensing device in a light receiving relationship with light reflected from the substrate surface, detects light reflected from the substrate surface. Signals are generated indicative of sensed light intensity. A first magnitude range indicates illuminated ridges and a second magnitude range indicates depressions hidden in shade. Control circuitry, electrically connected to the light sensing device receives the signals of ridges and depressions for discriminating therebetween to generate a set of signals indicating surface relief of the substrate.

In accordance with another aspect of the invention, there is provided a printing machine of the type in which substrates adapted to have visible images formed thereon have a surface relief feature thereof identified. The improvement includes a light source positioned adjacent to the substrate surface to illuminate the substrate surface at a grazing incidence of illumination. A light sensing device in a light receiving relationship with light reflected from the substrate surface, detects light reflected from the substrate surface. Signals are generated indicative of sensed light intensity. A first magnitude range indicates ridges and a second magnitude range indicates depressions. Control circuitry, electrically connected to the light sensing device receives the signals of ridges and depressions for discriminating therebetween to generate a set of signals indicating surface relief of the substrate.

In accordance with yet another aspect of the invention, there is provided a method for identifying the surface relief feature of a substrate surface. The method for identifying the surface relief feature of a substrate surface includes the step of illuminating the substrate surface with grazing incidence illumination. The method of the present invention also includes the steps of sensing light reflected from the substrate surface, with a first magnitude range indicating ridges and a second magnitude range indicating depressions, discriminating between the first magnitude range indicating ridges and the second magnitude range indicating depressions, generating a set of signals indicating surface relief of the substrate surface, identifying the surface relief of the substrate surface, and generating a reference signal in response to the identified substrate surface.

While the present invention will hereinafter be described in connection with a preferred embodiment thereof, it will be understood that it is not intended to limit the invention to that embodiment. On the contrary, it is intended to cover all alternatives, modifications and equivalents that may be included within the spirit and scope of the invention as defined by the appended claims.

Figure 1:
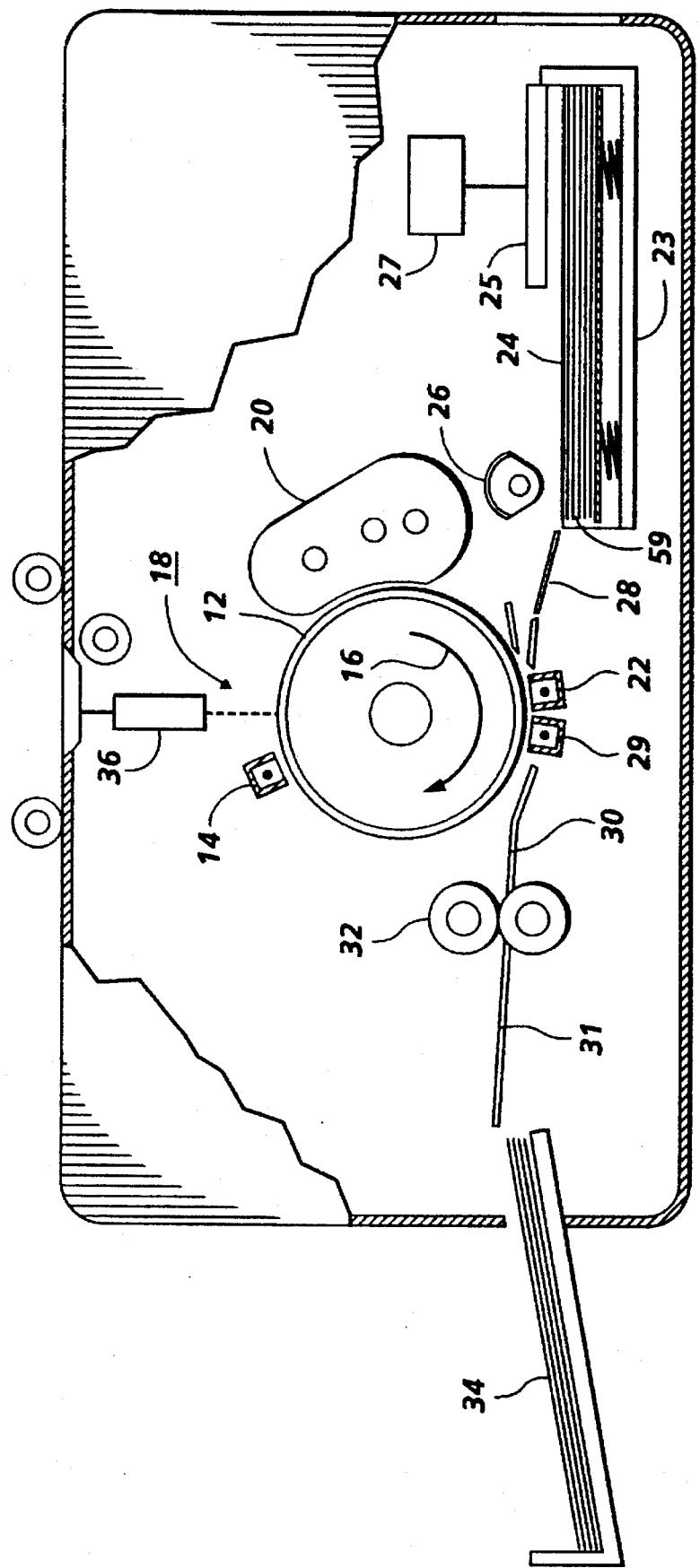
FIG. 1 is an elevational view of a printing machine in which the present invention can be utilized.

For a general understanding of the features of the present invention, reference is made to the drawings. In the drawings, like reference numerals have been used throughout to designate identical elements. FIG. 1, schematically depicts the various elements of an illustrative electrophotographic printing machine incorporating an apparatus for identifying substrate surface relief characteristics. It will become evident from the following discussion that the apparatus for identifying substrate surface relief characteristics is equally well suited for use in a wide variety of printing machines and is not necessarily limited in its application to the particular embodiment depicted herein.

Inasmuch as the art of electrophotographic printing is well known, the various processing stations employed in the FIG. 1 printing machine will be shown hereinafter schematically and their operation described briefly with reference thereto.

Turning to FIG. 1, the electrophotographic printing machine employs a photoconductive surface 12 movable in the direction of arrow 16 to advance portions thereof sequentially through various processing stations. A substrate surface relief identifier 25 is located in supply tray 23 so that the surface relief of the substrate can be detected while the substrate is in a static state. Output signals from surface relief identifier 25 are processed and identified by control circuitry 27 that communicates with a machine controller (not shown) to make adjustments to machine parameters before the substrate is processed through the machine. It is understood, however, that the substrate surface relief identifier 25 of the present invention can be positioned at other locations in a machine. Surface relief identifier 25 will be described in detail with reference to FIGS. 2 through 7.

At a charging station, a corona generating device 14 electrically connected to a high voltage power supply charges the photoconductive surface 12 to a relatively high, substantially uniform potential. Next, the charged portion of the photoconductive surface 12 is advanced through exposure station 18. At exposure station 18, an original document is positioned on a transparent platen (not shown). Lamps (not shown) illuminate the original document and light rays reflected from the original document are transmitted onto photoconductive surface 12. The light rays reflected from original document are transmitted through lens 36 forming a light image thereof. Lens 36 focuses the light image onto the charged portion of photoconductive surface 12 to selectively dissipate the charge thereon. This records an electrostatic latent image on photoconductive surface 12 which corresponds to the informational areas contained within original document disposed upon the transparent platen. Thereafter, the electrostatic latent image recorded on photoconductive surface 12 advanced to a development station 20.

One skilled in the art will appreciate that a Raster Input Scanner (RIS) and a Raster Output Scanner (ROS) may be used instead of the light lens system heretofore described. The RIS contains document illumination lamps, optics, a mechanical scanning mechanism and photosensitive elements such as charge coupled device (CCD) arrays. The RIS captures the entire image from the original document and converts it to a series of raster scan lines. These raster scan lines are outputted from the RIS and function as the input to the ROS. The ROS performs the function of creating the output copy of the image and lays out the image in a series of horizontal lines with each line having a specific number of pixels per inch. These lines illuminate the charged portion of the photoconductive surface to selectively discharge the charge thereon. An exemplary ROS has lasers with rotating polygon mirror blocks, solid state modulator bars and mirrors. Still another type of exposure system would merely utilize a ROS with the ROS being controlled by the output from an electronic subsystem (ESS) which prepares and manages the image data flow between a computer and the ROS. The ESS is the control electronics for the ROS and may be a self-contained, dedicated minicomputer.

At development station 20, a magnetic brush developer system, transports a developer material of carrier granules having toner particles adhering triboelectrically thereto into contact with the electrostatic latent image recorded on photoconductive surface 12. Toner particles are attracted from the carrier granules to the latent image forming a toner image on photoconductive surface 12.

One skilled in the art will appreciate that a liquid developer material may be used instead of dry developer material After development, photoconductive surface 12 advances the toner powder image to a transfer station. At transfer station 22, a single substrate 24 is moved into contact with the toner powder image. The substrate 24 is advanced from tray 23 to the transfer station by sheet feeding apparatus 26 contacting the uppermost sheet of the stack. Sheet feeding apparatus 26 rotates so as to advance sheets from a stack 59 onto transport 28. The transport 28 directs the advancing substrate into contact with the photoconductive surface 12 in timed sequence in order that the toner powder image developed thereon contacts the advancing substrate at the transfer station.

Transfer station 22 includes a corona generating device which applies electrostatic transfer charges onto the underside of substrate 24 and electrostatically tacks substrate 24 against photoconductive surface 12. The electrostatic transfer charges attracts the toner image from photoconductive surface 12 to substrate 24.

After transfer, substrate 24 is transported on the photoconductor surface 12 under detacking corona generator 29 which neutralizes most of the tacking charge thereon. However, it is not desirable to remove all of the transfer charges on substrate 24, since that may reduce the electrostatic retention of the toner image to substrate 24. The detack charge, preferably applied with an alternating current corona emission is sufficient to allow substrate 24 to self strip from the photoconductive surface 12.

Substrate 24 continues to move onto transport 30. Transport 30 advances substrate 24 to fusing station 32. Fusing station 32 generally includes a heated fuser roller and a backup roller for permanently affixing the transferred toner image to substrate 24. After fusing, substrate 24 is advanced along transport 31 to a catch tray 34 for removal by an operator.

Figure 2:
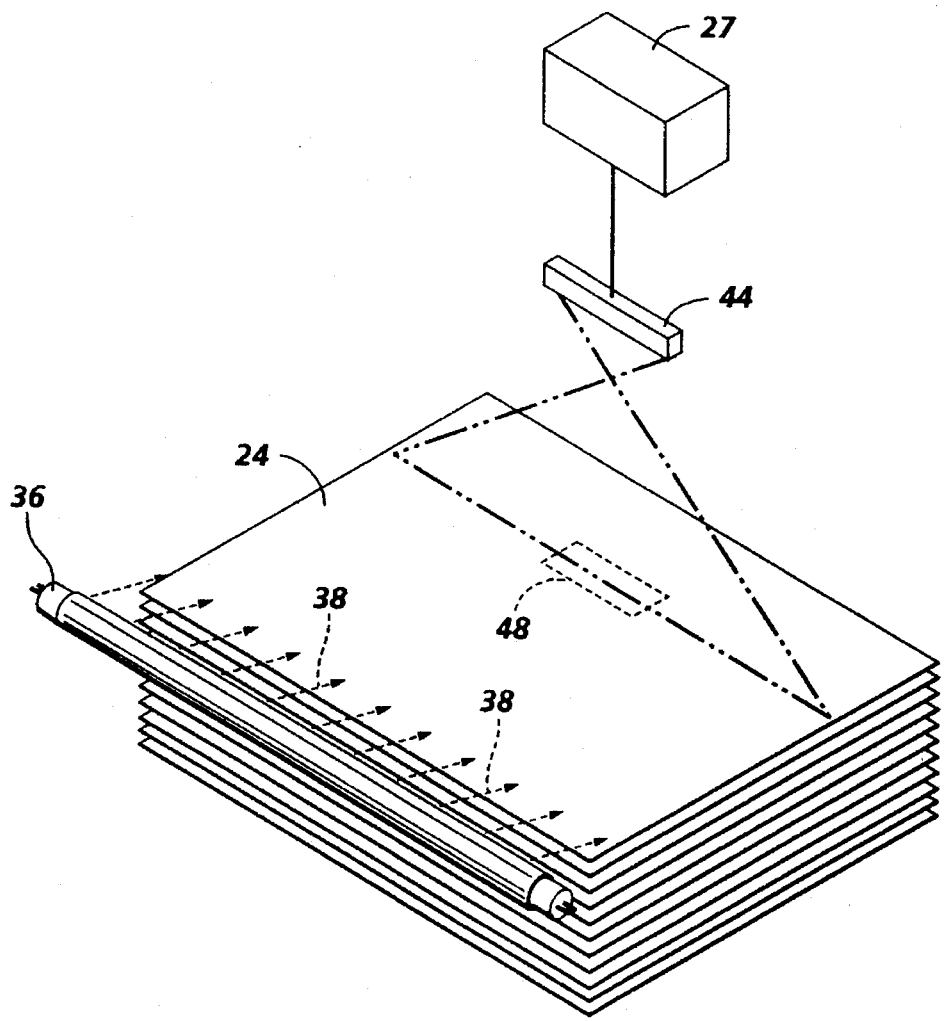
FIG. 2 is a perspective view showing identification of characteristics of a substrate used in the FIG. 1 printing machine.

FIG. 2 shows an apparatus that identifies the surface relief characteristics of the substrate 24. Referring to FIG. 2, the surface relief identifier 25 of FIG. 1 has an elongated light source 36 positioned adjacent to a longitudinal axis of substrate 24. A photosensitive element, such as a one dimensional, 128 pixel charge coupled device (CCD) array 44, is connected to circuitry 27. The interactions of light beams 38 from light source 36 with substrate 24 reveal a portion 48 of the surface relief features of substrate 24. The illuminated portion 48 of substrate 24 has appearance characteristics explained with reference to FIGS. 3 and 4.

Figure 3:
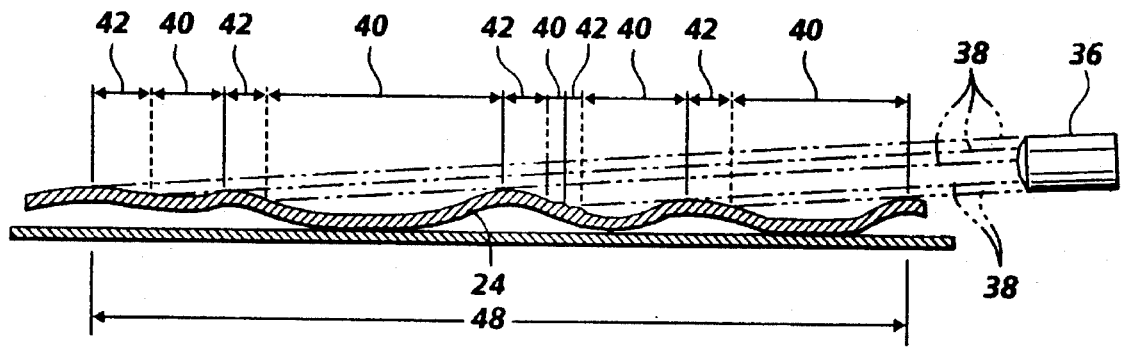
FIG. 3 is a sectional elevational view showing a substrate in the FIG. 1 printing machine.

FIG. 3 is a sectional elevational view showing a substrate in the FIG. 1 printing machine. The profile of substrate 24 is exaggerated to emphasize a substrate 24 having a cockled appearance that is characterized by a plurality of ridges 42 and a plurality of depressions 40. Light source 36 is positioned to illuminate a small portion 48 (approximately 1–2 in. sq.) of the surface of substrate 24. Light beams 38 have a very shallow angle of incidence that typically strike the substrate surface at an angle of less than 10 degrees. As light beams 38 graze and illuminate ridges 42, the appearance of substrate 24 is modified by traces of shade in each of the depressions 40.

Figure 4:
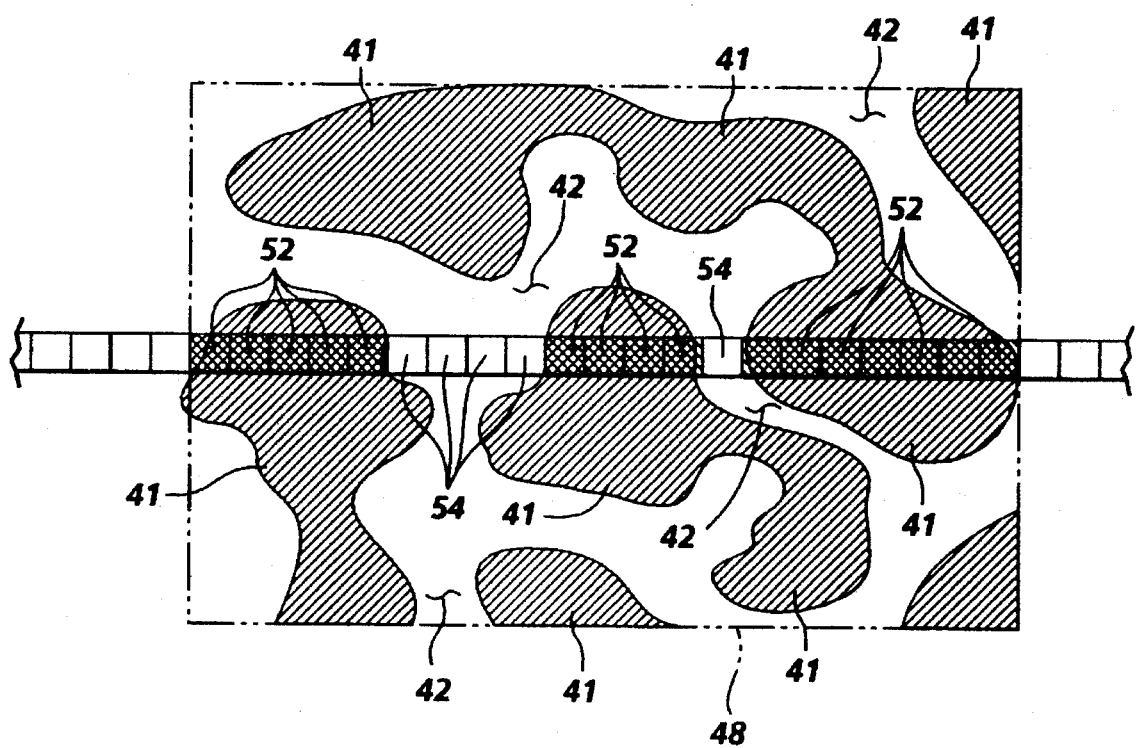
FIG. 4 is a plan view showing the topography of a cockled surface of the FIG. 3 substrate.

FIG. 4 shows the illuminated surface 48 as a random pattern of shadows 41 and illuminated area 42. CCD 44 is located to receive light reflected from the illuminated surface 48. The individual pixels element of CCD 44 generate responsive gray scale signals at each pixel output. Pixel elements 54 generate output signals corresponding to white reflections from the light area 42. Pixel elements 52 generate gray scale output signals corresponding to portions of the shadows 41.

Referring again to FIG. 2, one skilled in the art of digital image processing will appreciate that processing of the image captured by CCD array 44 is accomplished by techniques of pattern recognition. Real time operation can be consolidated into hardware and software functions that are implemented in a single Application Specific Integrated Circuit ASIC chip contained in control circuitry 27.

While processing the input gray scale data, the ASIC chip in controller 27 constructs a histogram to discriminate the input data between illuminated and shaded intensities. The discriminated data is then converted to a set of one bit per pixel signals being either zeros for white or ones for dark. Each pixel is approximately a one millimeter representation of the scanned image.

A software algorithm in control circuitry 27 processes the captured image. It calculates the average length of an image segment by counting all the pixels (illuminated and dark) in the image and dividing the count by the number of segments comprising the image. If the quotient is equal to or greater than a preset value of approximately 3 millimeters previously determined with laboratory measurements, the substrate is recognized as being cockled.

As shown in FIG. 4, CCD array 44 includes 20 individual pixels conveying light and dark information. Additionally, the scanned image is made up of 5 segments including 3 segments of dark pixels 52, and 2 segments of light pixels 54. The algorithm finds the average length of a segment (resulting from the division of 20 pixels by 5 segments) to be 4 millimeters which is more than the 3 preset value. Thus, the illuminated surface 48 shown in FIGS. 2, 3, and 4 is recognized by the present invention as being a cockled substrate.

Figure 5A:
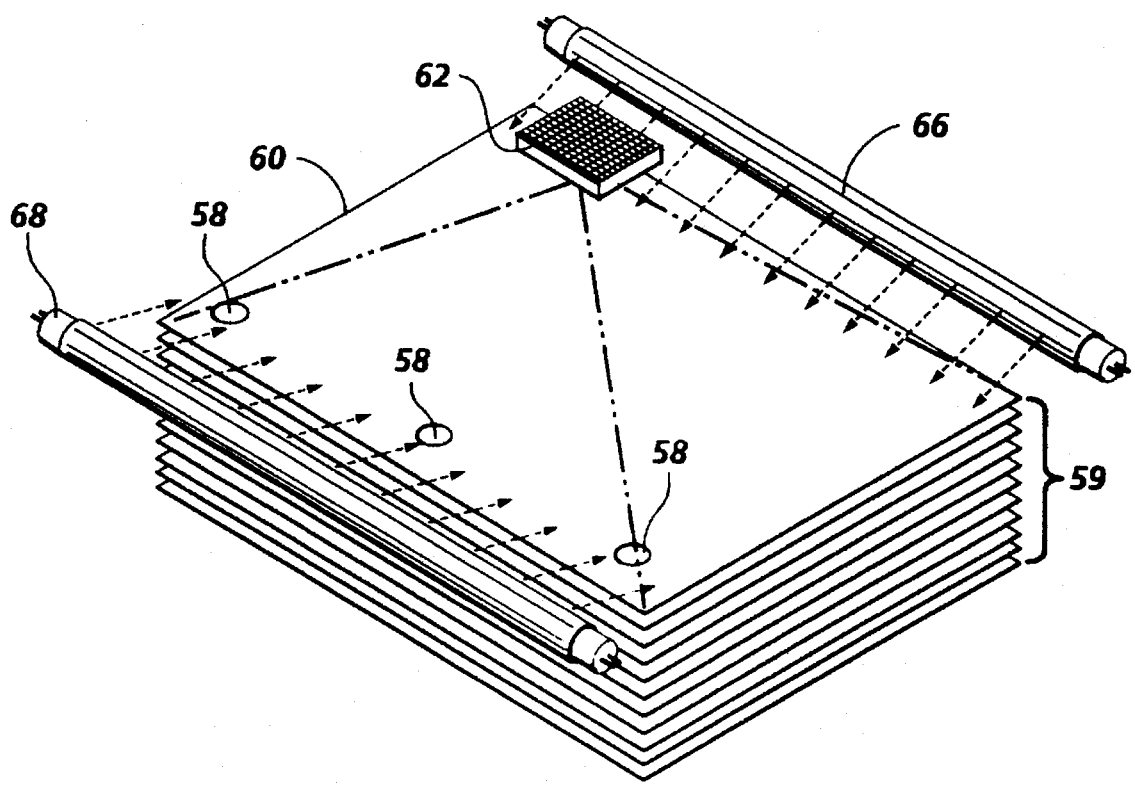
FIG. 5A is a perspective view showing identification of the surface characteristics of a substrate having holes in a marginal region thereof.

FIG. 5A shows substrates having ring binder holes being detected with grazing incidence illumination. For detecting three hole substrates, the grazing illumination should preferably cover the full length of a substrate. In FIG. 5A, the method of detecting substrate 60 is expanded by employing light sources 66 and 68. Light sources 66 and 68 may be, for example, fluorescent lamps or flash lamps. A photosensitive element such as a two dimensional, 64 by 128 pixel charge coupled device (CCD) array 62 extracts gray scale data from the illuminated surface of substrate 60. The sequential illuminations of substrate 60 by light beams from light sources 66 and 68 reveal the surface relief features. Holes 58 appear as dark voids when substrate 60 is at the top of a high substrate stack 59. When there is only a single substrate 60 or a few substrate sheets comprising stack 59, holes 58 appear as crescent shaped shadows.

Figure 5B:
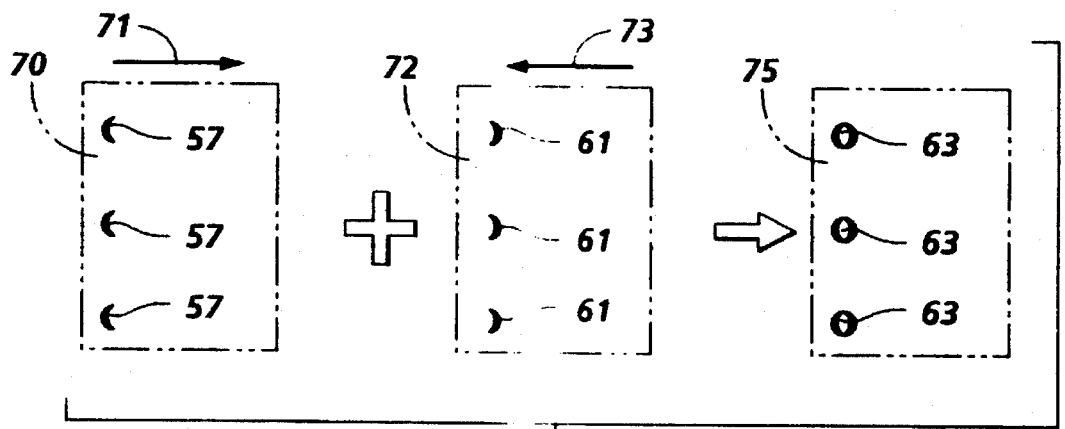
FIG. 5B is a planar view of the composite images of the FIG. 5A substrate.

FIG. 5B illustrates recovery of a full image pattern by superimposing separate two dimensional images obtained with alternate illumination by light sources 66 and 68. Substrate 60 is assumed to be the only sheet in substrate stack 59. Consequently holes 58 appear as crescent shaped shadows. The first image 70 is obtained by light source 68 (FIG. 5A) illuminating substrate 60 (FIG. 5A) in the direction of arrow 71. One skilled in the art of digital image processing will appreciate that the two dimensional gray scale image is converted to a set of one bit per pixel signals of ones and zeros to represent a plurality of crescent shaped shadows 57 amid a light reflected background. Next, the second image 72 is obtained by light source 66 (FIG. 5A) illuminating substrate 60 (FIG. 5A) in the direction of arrow 73. This gray scale image is also converted to a set of one bit per pixel signals of ones and zeros. In the second image 72, the pixel signals represent a plurality of crescent shaped shadows 61 amid a light reflected background. A pattern recognition algorithm superimposes image 70 over image 72 to generate image 75 in the form of voids 63. Further processing by the algorithm to match the bitmap of image 75 against stored templates will identify image 75 as a three hole substrate.

Figure 6A:
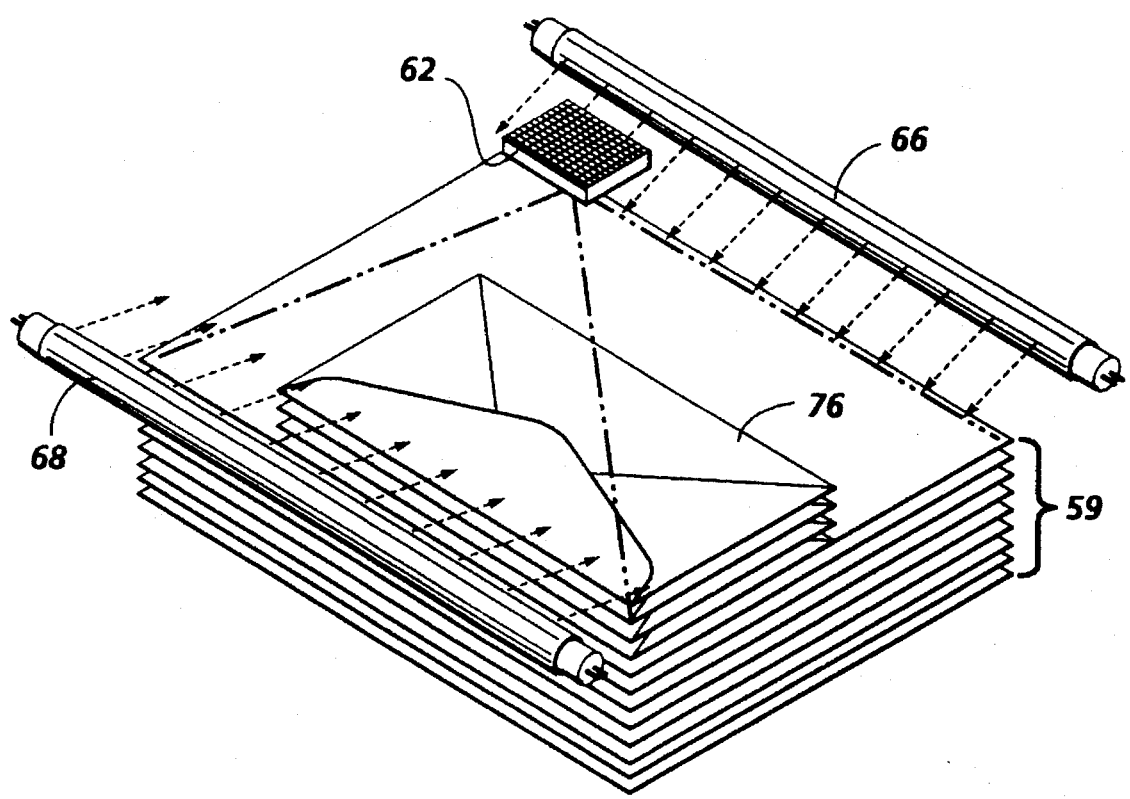
FIG. 6A is a perspective view showing identification of the surface characteristics of a substrate which is an envelope.

FIG. 6A shows the detection of envelopes made with grazing incidence illumination. Envelopes should be stacked with the flap side up such that grazing incidence illumination produces a characteristic shadow outlining the flap. A bitmap of the shape can be recognized not only by a template match, but also by detecting the symmetry of the image. As shown in FIG. 6A, the method of detecting envelope 76 employs light sources 66 and 68. Light sources 66 and 68 are, for example, fluorescent lamps or flash lamps mounted slightly above and at opposite longitudinal ends of substrate stack 59. A 64 by 128 pixel charge coupled device (CCD) array 62 extracts gray scale data from the illuminated surface of envelope 76. The interactions of light beams from light sources 66 and 68 with envelope 76 reveal the surface relief features.

Figure 6B:
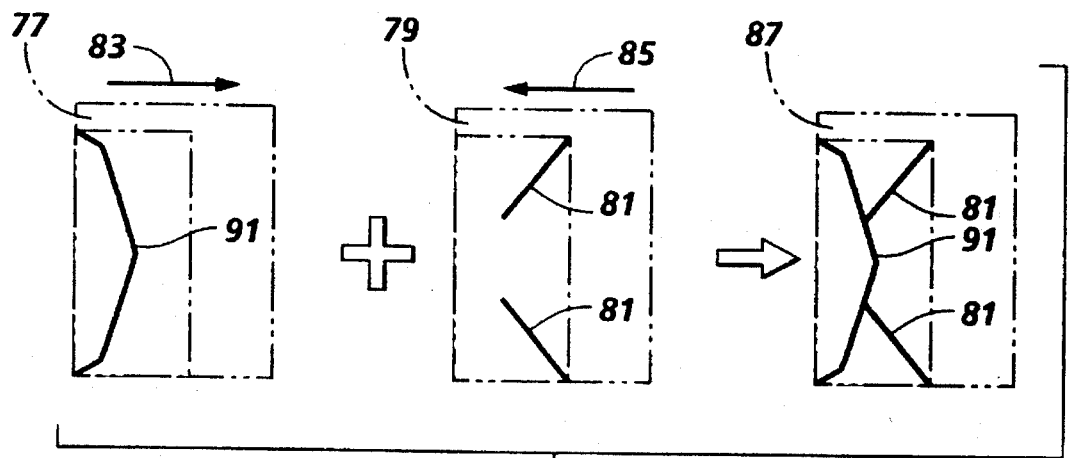
FIG. 6B is a planar view of the composite images of the FIG. 6A envelope.

FIG. 6B illustrates the recovery of a full image pattern by superimposing separate two dimensional images obtained with alternate illumination by light sources 66 and 68. The first image 77 is obtained by light source 68 (FIG. 6A) illuminating envelope 76 (FIG. 6A) in the direction of arrow 83. Again, one skilled in the art of digital image processing will appreciate that the two dimensional gray scale image is converted to a set of one bit per pixel signals of ones and zeros to represent an envelope flap 91 amid a light reflected background. Next, the second image 79 is obtained by light source 66 (FIG. 6A) illuminating envelope 76 (FIG. 6A) in the direction of arrow 85. This gray scale image is also converted to a set of one bit per pixel signals of ones and zeros. In the second image 79, the pixel signals represent two semi-diagonal shadows 81. A pattern recognition algorithm superimposes image 77 over image 79 to generate image 87. Further processing by the algorithm to match the bitmap of image 87 against stored templates identifies image 87 as an envelope.

Figure 7:
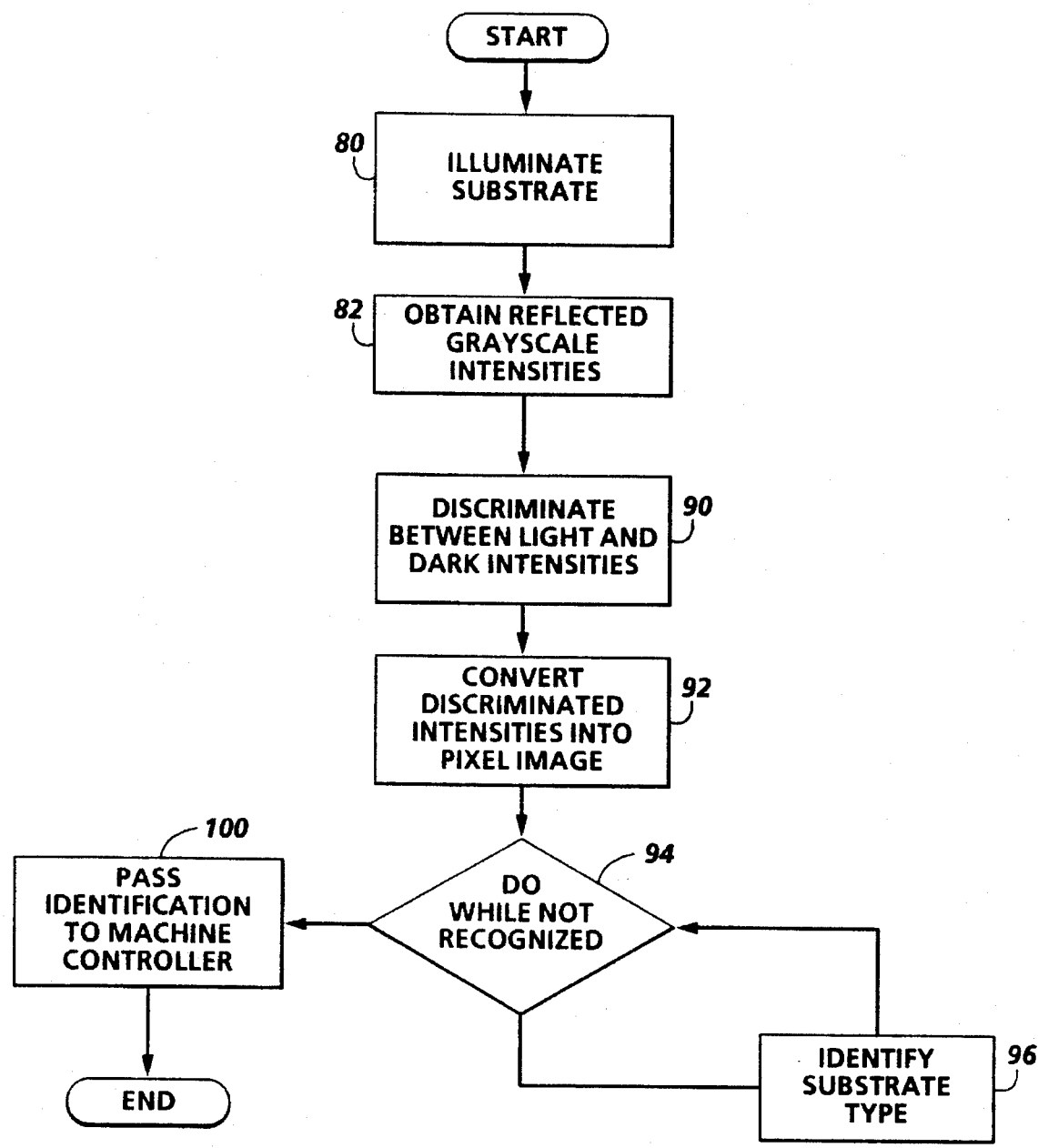
FIG. 7 is a flow chart of the process steps for identifying a substrate with the present invention.

FIG. 7 is a flow chart illustrating the process steps for identifying a substrate with the present invention. Starting at step 80, a substrate is illuminated. Reflected gray scale intensities are obtained at step 82. The image is either one or two dimensional. Discrimination between light and dark intensities is performed at step 90. The input gray scales image is converted into a set of one bit per pixel signals at step 92.

At step 94, the process employs pattern recognition and repetitively executes step 96 to identify the substrate type. The one bit per pixel image is evaluated to find the best match template. Once the image is recognized, the looping at step 94 terminates and the process advances to step 100. At step 100, the machine controller is instructed to optimize the machine parameters as a function of the substrate type identified in step 96. Depending on the sophistication of the machine controller, it proceeds to alert the operator at the end.

It will be obvious to one skilled in the art that the present invention may be used in other machine; types for marking on a substrate. Accordingly, it is possible to monitor a substrate moving along a path. However, it is also obvious to one skilled in the art that any interfering hardware shape, such as, for example, a feed roll, located above the feed tray must be accounted for in the evaluated bitmap to avoid false detections.

Monitoring a moving substrate provides full, two dimensional scan with a one dimensional photosensitive array. It is applicable to the types of substrates previously described.

It will also be obvious to one skilled in the art, that signals from the apparatus of the present invention can be further combined with signals from other machine diagnostic devices to indirectly provide controlled processing operations of the machine through an intermediate operator control step. For example, an operator may be prompted to check on paper size and thickness, or that envelopes, forms, and documents having pre-printed logos are loaded right side up, or in their proper orientation.

It is, therefore, evident that there has been provided in accordance with the present invention, a surface relief identifying apparatus that fully satisfies the aims and advantages hereinbefore set forth. While this invention has been described in conjunction with a specific embodiment thereof, it is evident that many alternatives, modifications and variations will be apparent to those skilled in the art. For example, it can be appreciated that the present invention may find useful application in a paper or other substrate handling machine having processing operations which do not include marking onto the substrate. Accordingly, it is intended to embrace all such alternatives, modifications and variations that fall within the spirit and broad scope of the appended claims.

I claim:

1. An apparatus for identifying surface release features of a substrate surface, including:

a light source positioned adjacent to the substrate surface to illuminate the surface at a grazing incidence of illumination, said light source illuminates the substrates surface at an angle of less than 10 degrees;

a light sensing device, in a receiving relationship with light reflected from the substrate surface, for detecting light reflected from the substrate surface, and generating signals indicative of sensed light intensity, with a first magnitude range indicating ridges and a second magnitude range indicating depressions; and control circuitry, electrically connected to said light sensing device, to receive the signals of ridges and depressions for discriminating therebetween to generate a set of signals indicating surface relief of the substrate.

2. An apparatus according to claim 1, wherein said light sensing device comprises a plurality of sensors.

3. An apparatus according to claim 1, wherein said control circuitry comprises means for identifying the surface relief of the substrate surface and generating a reference signal therefrom.

4. An apparatus according to claim 1, wherein the surface relief feature of the substrate surface is detected while the substrate is stationary.

5. An apparatus for identifying surface relief features of a substrate surface, including:

a light source positioned adjacent to the substrate surface, to illuminate the surface at a grazing incidence of a illumination;

a light sensing device, in a receiving relationship with light reflected from the substrate surface, for detecting light reflected from the substrate surface and generating signals indicative of sensed light intensity, with a first magnitude range indicating ridges and a second magnitude range indicating depressions; and control circuitry, electrically connected to said light sensing device, to receive the signals of ridges and depressions for discriminating therebetween to generate a set of signals indicating surface relief of the substrate, wherein the set of signals indicating surface relief of the substrate are one bit per pixel signals.

6. A printing machine of the type in which substrates adapted to have visible images formed thereon have a surface relief feature thereof identified, wherein the improvement includes:

a light source positioned adjacent to the substrate surface to illuminate the surface at a grazing incidence of illumination;

a light sensing device in a receiving relationship with light reflected from the substrate surface, for detecting light reflected from the substrate surface, and generating signals indicative of sensed light intensity, with a first magnitude range: indicating ridges and a second magnitude range indicating depressions; and control circuitry, electrically connected to said light sensing device to receive the signals of ridges and depressions, for discriminating therebetween to generate a set of single bit signals indicating surface relief of the substrate.

7. A printing machine according to claim 6, wherein said said light source illuminates the substrate surface at an angle of less than ten degrees.

8. A printing machine according to claim 7, wherein said light sensing device comprises a plurality of sensors.

9. A printing machine according to claim 6, wherein the set of signals indicating surface relief of the substrate are one bit per pixel signals.

10. A printing machine according to claim 6, wherein said control circuitry comprises means for identifying the surface relief of the substrate surface and generating a reference signal therefrom.

11. A printing machine according to claim 6, wherein the surface relief feature of the substrate surface is detected while the substrate is stationary.

12. A method of identifying a surface relief feature of a substrate surface, comprising:

illuminating the substrate surface with grazing incidence illumination;

sensing light intensity reflected from the substrate surface, with a first magnitude range indicating ridges and a second magnitude range indicating depressions;

discriminating between the first magnitude range indicating ridges and the second magnitude range indicating depressions;

generating a set of signals indicating surface relief of substrate surface;

identifying the surface relief of the substrate surface;

generating a reference signal in response to the identified substrate surface; and controlling a printing machine processing operation as a function of the reference signal.

* * * * *